US012658842B1

(12) United States Patent
Leman

(10) Patent No.: US 12,658,842 B1
(45) Date of Patent: Jun. 16, 2026

(54) PHOTOVOLTAIC ROOFING APPARATUS

(71) Applicant: Doug Leman, Vero Beach, FL (US)

(72) Inventor: Doug Leman, Vero Beach, FL (US)

( * ) Notice: Subject to any disclaimer, the term of this patent is extended or adjusted under 35 U.S.C. 154(b) by 0 days.

(21) Appl. No.: 18/811,629

(22) Filed: Aug. 21, 2024

Related U.S. Application Data

(60) Provisional application No. 63/604,020, filed on Nov. 29, 2023.

(51) Int. Cl.
*H02S 20/32* (2014.01)
*H02S 40/42* (2014.01)

(52) U.S. Cl.
CPC ............ *H02S 20/32* (2014.12); *H02S 40/425* (2014.12)

(58) Field of Classification Search
None
See application file for complete search history.

(56) References Cited

U.S. PATENT DOCUMENTS

| | | | |
|---|---|---|---|
| 7,297,866 B2 | 11/2007 | Aschenbrenner | |
| 9,410,325 B2 | 8/2016 | Koehler | |
| 11,543,155 B2 | 1/2023 | Daniels | |
| 11,692,358 B2 | 7/2023 | Thomson | |
| 2007/0227583 A1 | 10/2007 | Davies et al. | |
| 2008/0302030 A1* | 12/2008 | Stancel | H02S 20/25 |
| | | | 136/246 |
| 2009/0120484 A1 | 5/2009 | Nightingale | |
| 2010/0313501 A1 | 12/2010 | Gangemi | |

| | | | |
|---|---|---|---|
| 2014/0166082 A1* | 6/2014 | Langmaid | H02S 20/00 |
| | | | 136/251 |
| 2014/0260000 A1* | 9/2014 | Haynes | H02S 20/23 |
| | | | 52/302.1 |
| 2023/0019242 A1 | 1/2023 | Prasad H S et al. | |

FOREIGN PATENT DOCUMENTS

| | | | | |
|---|---|---|---|---|
| CN | 109339354 | 2/2019 | | |
| GB | 2467000 | 7/2010 | | |
| GB | 2509510 | 7/2014 | | |
| WO | WO-2011048565 A1 * | 4/2011 | | H02S 20/25 |
| WO | WO2012168674 | 12/2012 | | |
| WO | WO2016012528 | 1/2016 | | |

* cited by examiner

*Primary Examiner* — Ryan S Cannon
(74) *Attorney, Agent, or Firm* — MALLOY & MALLOY, PL

(57) ABSTRACT

The present invention is a photovoltaic roofing apparatus designed to enhance the attachment, installation, and structural integrity of solar roof tiles. The apparatus includes a photovoltaic tile encapsulated within a laminate structure, and a unitary support structure comprising a fastening mechanism, interlocking mechanism, and ventilation feature. The composite material construction offers enhanced fire resistance and durability. Key features include a double baffle ventilation system for cooling and fire prevention, hooks for adjustable tile exposure, edge protection, and alignment features for self-alignment during installation. This innovative design simplifies installation, reduces labor costs, improves fire resistance, and ensures reliable performance and aesthetic integration with both solar and passive roof tiles. The apparatus is versatile, adaptable to various roofing applications, and provides a cost-effective solution for integrating solar energy generation into building structures.

14 Claims, 8 Drawing Sheets

REPLACEMENT SHEET

PHOTOVOLTAIC ROOFING APPARATUS

CLAIM OF PRIORITY

This application claims the benefit of United States Provisional Patent Application 63/604,020 filed on Nov. 29, 2023, which is incorporated by reference herein in its entirety.

BACKGROUND OF THE INVENTION

Field of the Invention

The present invention relates to photovoltaic roofing systems, specifically to an innovative photovoltaic roofing apparatus designed to enhance the attachment, installation, and structural integrity of solar roof tiles.

Description of the Related Art

Solar roof tiles, also known as photovoltaic tiles, are an increasingly popular solution for integrating solar energy generation into building structures. These tiles typically consist of a glass "sandwich" or "laminate," which includes layers of glass, ethylene-vinyl acetate (EVA) foil, silicon wafers, EVA foil, and a back sheet. Additionally, these tiles require a junction box and a fastening structure to secure them to the roof. Existing solar roof tiles in the market vary in their attachment methods and structural compositions, each presenting unique challenges and limitations.

Various existing products utilize multiple materials and components such as rubber, aluminum clips, brackets, and grids for fastening and ventilation. These components are individually attached to the back of the glass sandwich, making the installation process labor-intensive and complex. Some systems employ intricate bracket systems that are difficult for installers to manage, while others use bases that are unsuitable for specific environments. Additionally, some products do not incorporate any structural support on the rear of their solar tiles, further complicating installation and reducing durability.

The attachment methods of existing solar roof tiles present significant challenges. The multi-component fastening systems, often involving several different materials, require extensive labor and precision during installation. This complexity can lead to increased costs and longer installation times. Additionally, the need for multiple suppliers for different components can complicate the supply chain, potentially leading to delays and inconsistencies in product quality. The coordination required to source and assemble these components from various suppliers can create logistical challenges, further complicating the installation process.

Fire resistance is another concern for photovoltaic roofing systems. Many current products use materials that, while functional, may not offer the best fire-resistant properties. Effective fire resistance is crucial to prevent the spread of fire through the roof structure, especially in areas prone to wildfires or other fire hazards. The ability to allow sufficient airflow for cooling while deterring fire spread is an important consideration in the design of solar roof tiles. The materials used in some existing products can reach their melting point under high temperatures, potentially leading to fire hazards if the roofing system does not adequately contain and dissipate heat.

Integration with existing roofing materials is also a significant factor. Most homes do not require full solar coverage, and the tempered glass used in solar tiles cannot be cut to fit specific dimensions. This necessitates the use of passive tiles made from different materials to cover the remaining roof areas. Ensuring a seamless blend between solar and passive tiles is important for aesthetic and functional reasons. A well-integrated roofing system must maintain a uniform appearance while also ensuring that both solar and non-solar tiles perform their respective functions effectively.

Another common issue with current solar roof tiles is their rigidity and inability to adjust to different roof shapes and sizes. The lack of flexibility in construction methods can limit the applicability of solar roof tiles to various building designs and geographical locations. Products that can be mounted directly to plywood or on elevated batten/counter batten systems offer greater adaptability and ease of installation in diverse construction scenarios. This flexibility is particularly important in regions with varied architectural styles and construction practices, where a one-size-fits-all approach is not feasible.

Wind resistance and the ability to withstand environmental factors such as rain and snow are also vital for solar roof tiles. The structural design must ensure that tiles remain securely attached under various weather conditions without causing damage or requiring frequent maintenance. The integration of ventilation systems that prevent direct airflow while allowing sufficient cooling is crucial for maintaining the efficiency and longevity of the solar cells. Proper ventilation helps prevent overheating of the solar cells, which can reduce their efficiency and lifespan. Moreover, the roofing system must be able to withstand strong winds and heavy precipitation without becoming dislodged or damaged.

In addition to these technical challenges, there are also practical considerations related to the installation and maintenance of solar roof tiles. The installation process must be straightforward enough for contractors to complete efficiently, yet robust enough to ensure long-term durability and performance. Maintenance is another important aspect, as solar roof tiles must be accessible for inspection, cleaning, and repair. Easy access to the tiles and their components can significantly reduce maintenance costs and downtime, ensuring that the roofing system remains functional and efficient over its lifetime.

In summary, while solar roof tiles offer a promising solution for renewable energy integration, they face several challenges related to installation complexity, fire resistance, material integration, structural flexibility, environmental durability, and practical maintenance. Addressing these issues is important to improving the efficiency, safety, and overall adoption of photovoltaic roofing systems in residential and commercial buildings. The development of innovative solutions that streamline installation, enhance fire resistance, seamlessly integrate with existing roofing materials, provide structural flexibility, and withstand environmental factors will play a crucial role in advancing the adoption of solar roof tiles.

SUMMARY OF THE INVENTION

The present invention is a photovoltaic roofing apparatus designed to improve the attachment, installation, and structural integrity of solar roof tiles. This apparatus, also referred to as an exoskeleton, integrates seamlessly with the glass sandwich of photovoltaic tiles, providing a single, injection-molded structure that includes preferred components such as a rain gutter system for tile locking, edge protection, protrusions for fastening, hooks for securing the tiles, a network of bracing for stability, and a double ventilation baffle for improved airflow and fire resistance. This innovative design simplifies the installation process, enhances durability, and ensures reliable performance in various environmental conditions.

The present invention offers significant advantages over prior art by addressing several issues associated with existing solar roof tiles. By reducing the installation process to a single step and eliminating the need for multiple suppliers and components, the invention minimizes labor costs and installation time. The use of composite materials enhances fire resistance, providing better protection against fire hazards. The exoskeleton's design allows for seamless integration with both solar and passive roof tiles, ensuring a uniform appearance and optimal performance. Additionally, the apparatus improves wind resistance and environmental durability, ensuring that the tiles remain securely attached under various weather conditions. Overall, this innovative photovoltaic roofing apparatus offers a more efficient, reliable, and cost-effective solution for integrating solar energy generation into building structures.

In a first implementation of the invention, a photovoltaic roofing apparatus comprises:

a photovoltaic tile including a photovoltaic cell encapsulated within a laminate structure;

a unitary support structure integrally formed with the photovoltaic tile, the unitary support structure comprising:

a fastening mechanism configured to secure the photovoltaic tile to a roofing substrate;

an interlocking mechanism configured to engage with adjacent photovoltaic tiles, forming a continuous and stable roofing surface;

a ventilation feature designed to allow airflow beneath the photovoltaic tile, enhancing cooling and preventing moisture accumulation; wherein the unitary support structure is designed to simplify installation, improve fire resistance, and provide enhanced structural stability to the photovoltaic tile.

In a second aspect, wherein the fastening mechanism may comprise protrusions configured to receive connectors for securing the photovoltaic tile to the roofing substrate.

In another aspect, wherein the connectors may be screws.

In another aspect, wherein the interlocking mechanism may comprise hooks configured to engage with corresponding features on adjacent photovoltaic tiles.

In another aspect, wherein the hooks may allow for adjustment of the exposure of the photovoltaic tile relative to adjacent tiles.

In another aspect, wherein the ventilation feature may comprise a double baffle system designed to permit airflow while preventing the passage of fire.

In another aspect, wherein the double baffle system may include staggered openings to enhance airflow and cooling efficiency.

In another aspect, wherein the laminate structure of the photovoltaic tile may include layers of glass, ethylene-vinyl acetate (EVA) foil, silicon wafers, EVA foil, and a back sheet.

In another, wherein the glass layer may be tempered for enhanced durability.

In another aspect, wherein the back sheet may be made of a composite material for improved fire resistance.

In another aspect, the photovoltaic roofing apparatus may further comprise edge protection integrated into the unitary support structure to protect exposed edges of the photovoltaic tile.

In another aspect, wherein the edge protection may include raised ridges or flanges to prevent damage to the edges of the photovoltaic tile.

In another aspect, wherein the unitary support structure may be made of a composite material that provides enhanced fire resistance compared to conventional materials.

In another aspect, wherein the composite material may include fire-retardant additives.

In another aspect, wherein the ventilation feature may be positioned at the lower edge of the photovoltaic tile to facilitate upward airflow.

In another aspect, wherein the ventilation feature may also act as a barrier to wind-driven rain and snow.

In another aspect, wherein the unitary support structure may further comprise alignment features that ensure proper placement and spacing of adjacent photovoltaic tiles.

In another aspect, wherein the alignment features may include notches or grooves that align with corresponding elements on adjacent tiles for self-alignment during installation.

In another implementation of the invention, a method of installing a photovoltaic roofing apparatus comprises:

providing a photovoltaic tile including a photovoltaic cell encapsulated within a laminate structure, and a unitary support structure integrally formed with the photovoltaic tile, the unitary support structure comprising a fastening mechanism, an interlocking mechanism, and a ventilation feature;

securing the photovoltaic tile to a roofing substrate using the fastening mechanism of the unitary support structure;

engaging the interlocking mechanism of the photovoltaic tile with corresponding features on adjacent photovoltaic tiles to form a continuous and stable roofing surface;

allowing airflow beneath the photovoltaic tile through the ventilation feature to enhance cooling and prevent moisture accumulation; wherein the method simplifies installation, improves fire resistance, and provides enhanced structural stability to the photovoltaic tile These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

5

Figure 3:
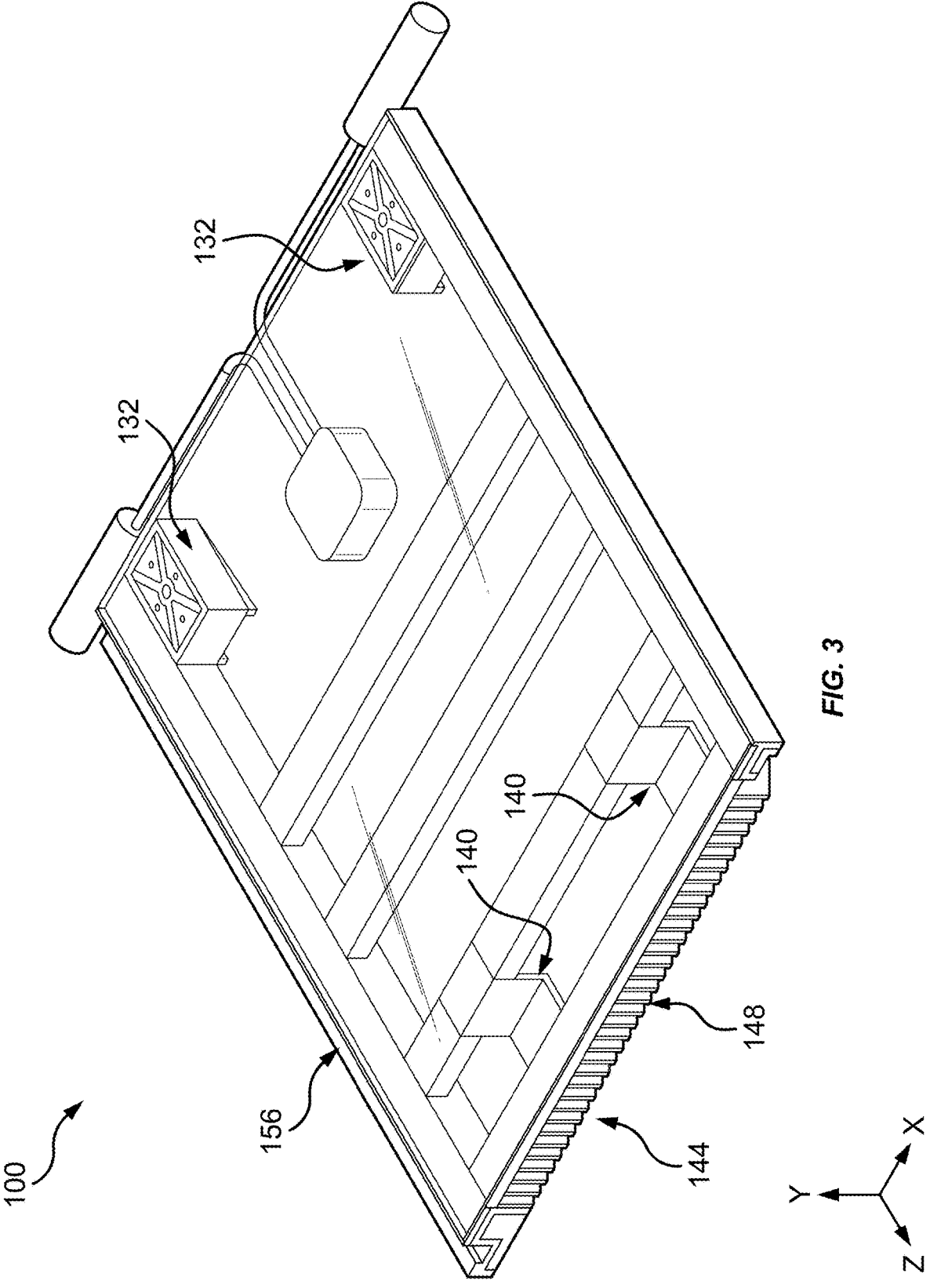
Figure 4:
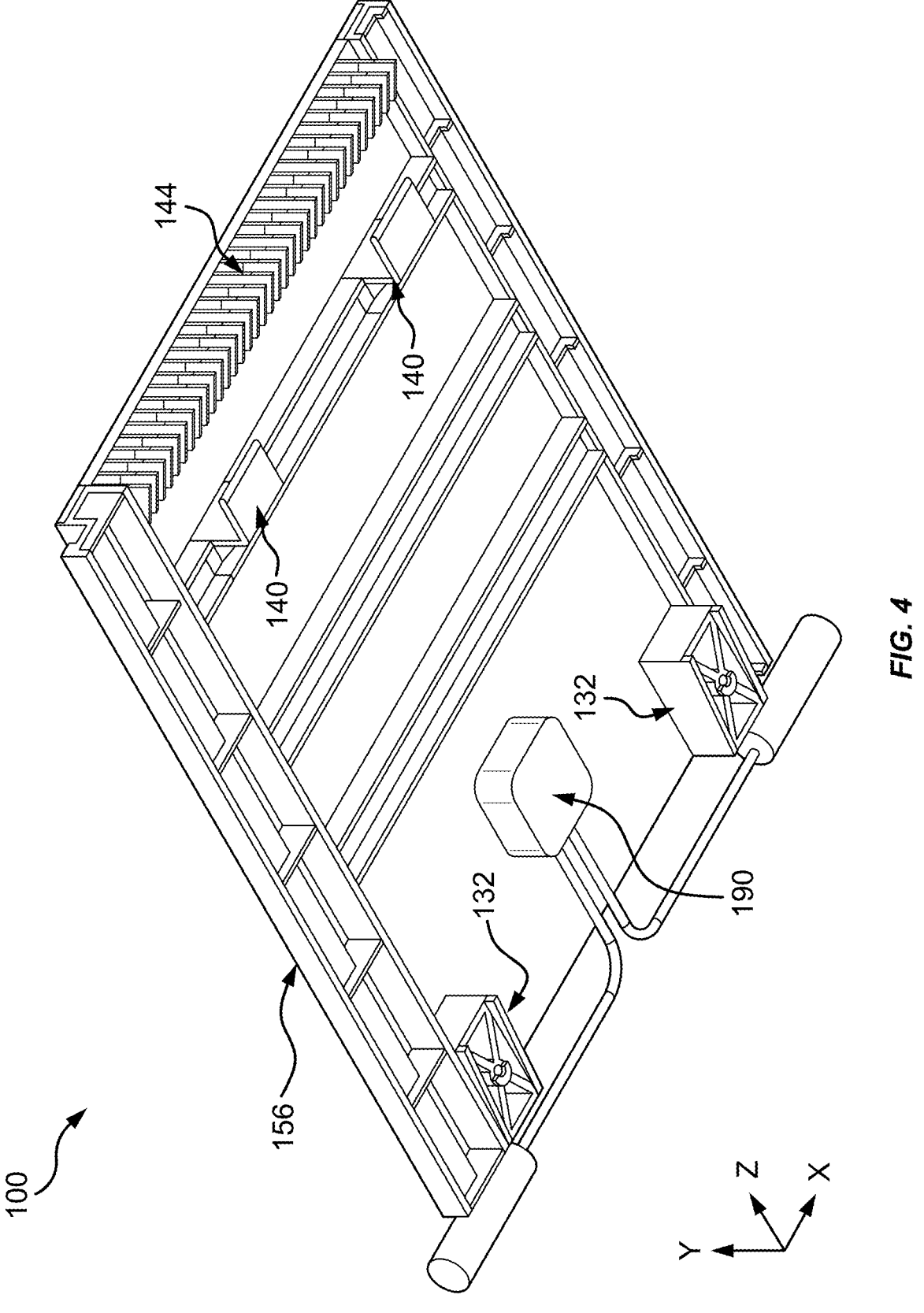
Figure 5:
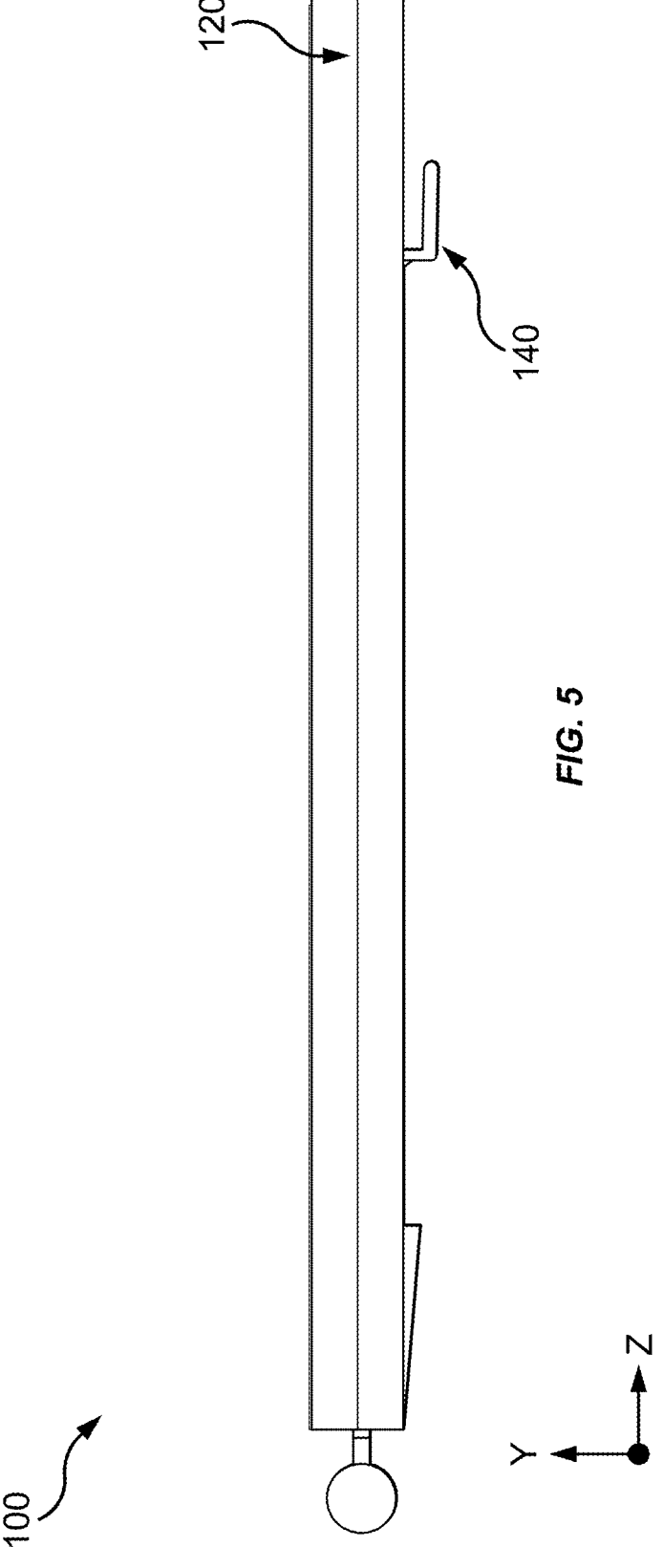
Figure 6:
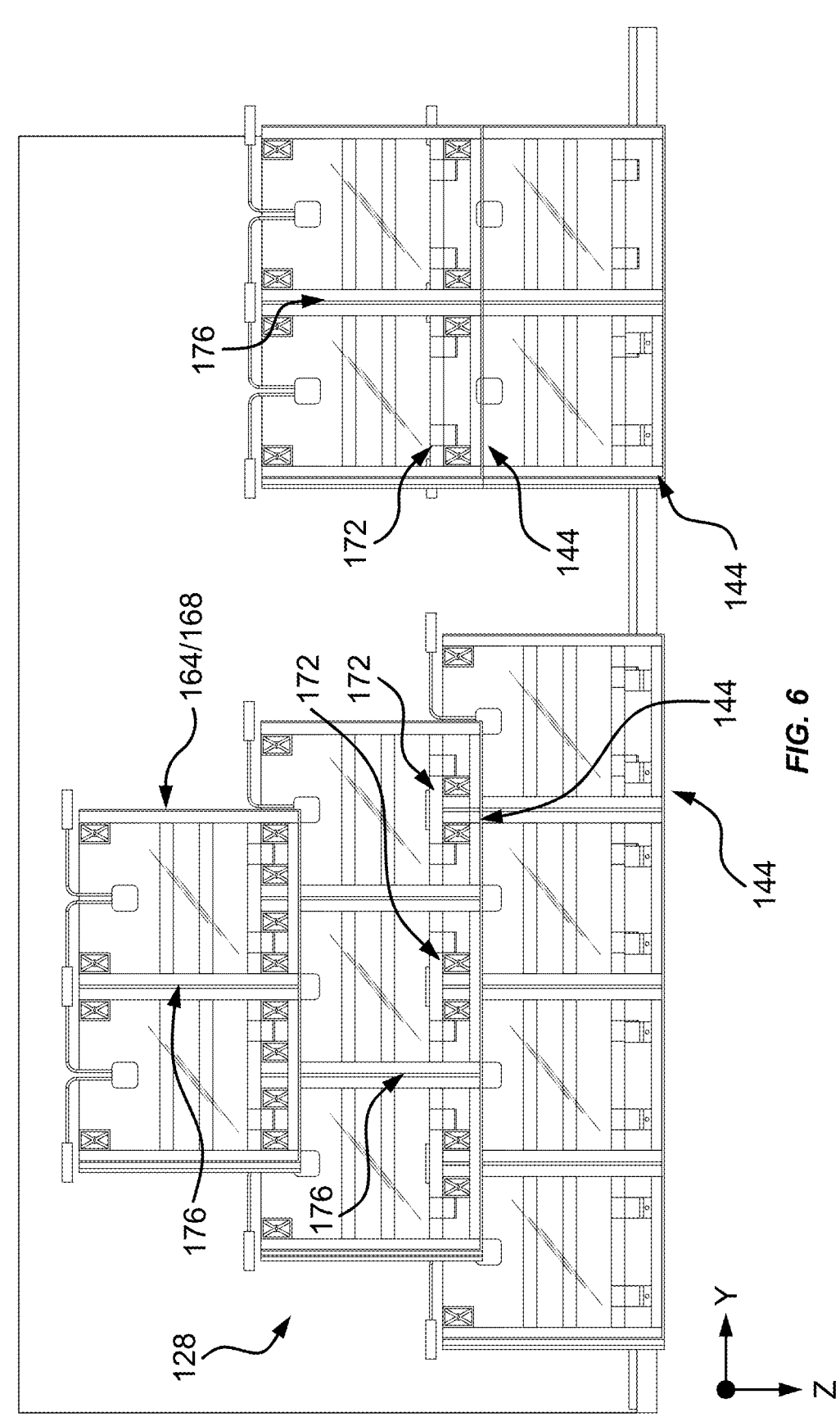
Figure 7:
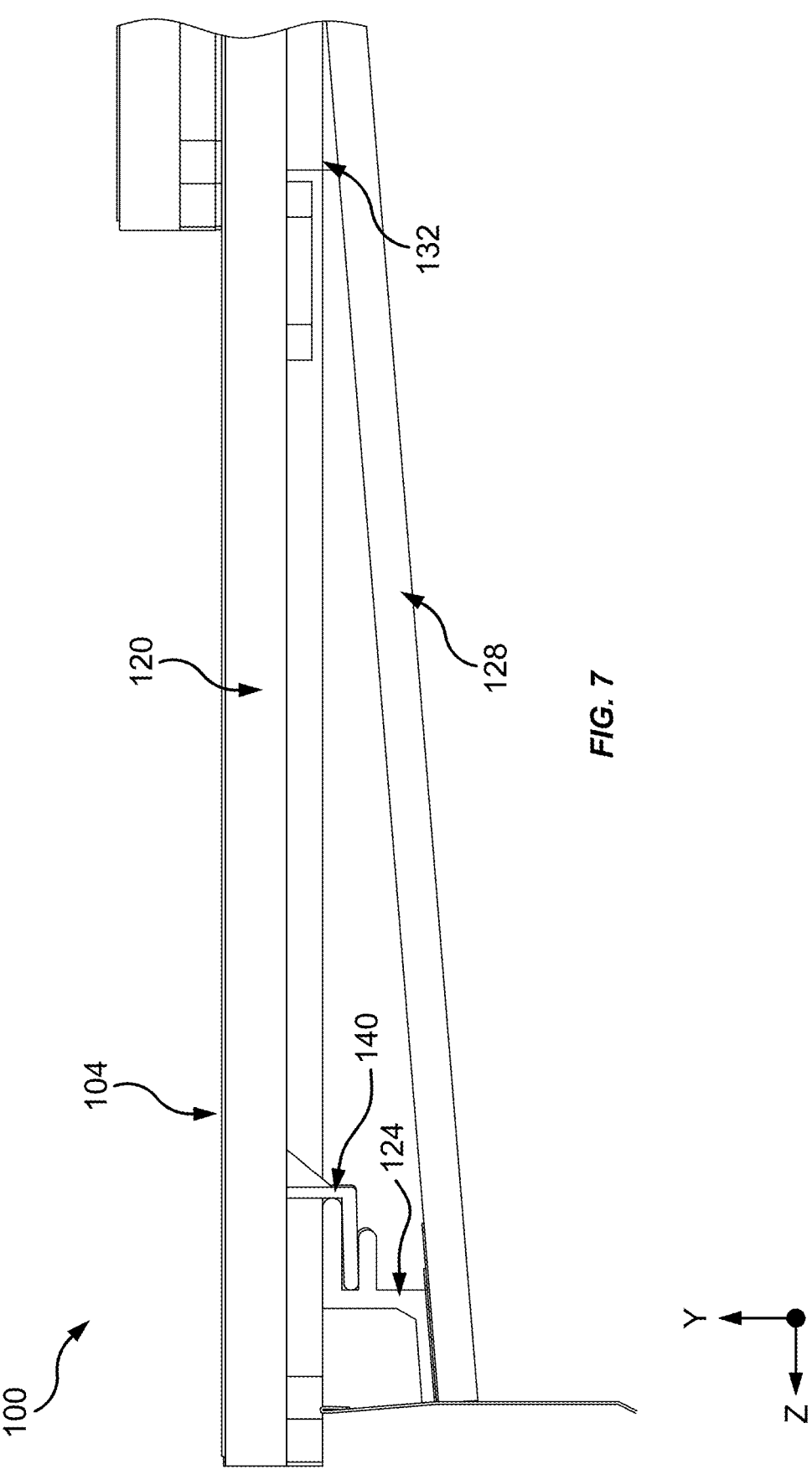
Figure 8:
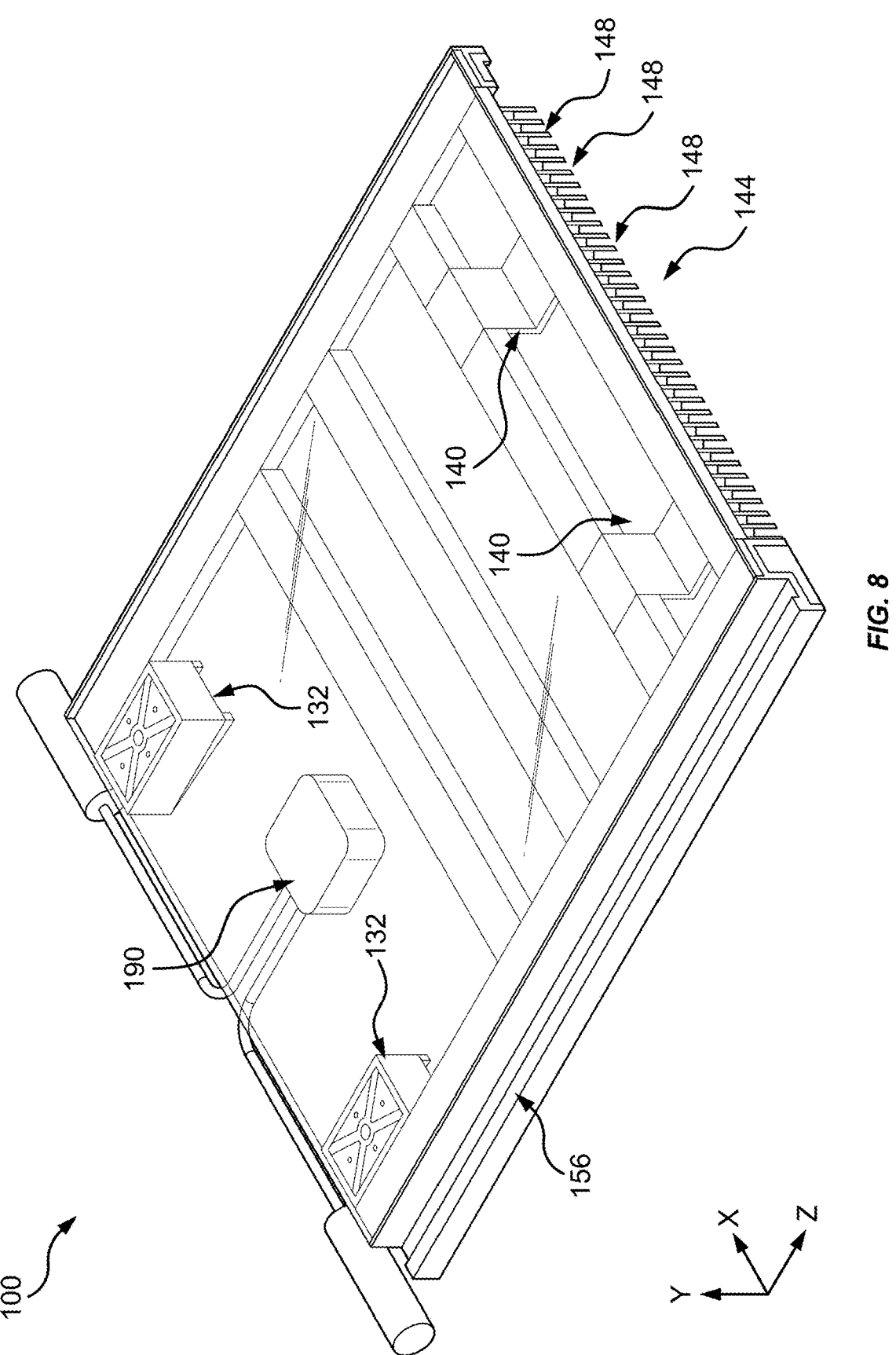

FIG. 3 presents an isometric view of the photovoltaic roofing apparatus, illustrating the overall structure, the interlocking features, and the ventilation system in relation to the unitary support structure;

FIG. 4 presents an alternative isometric view of the photovoltaic roofing apparatus, highlighting the cross-bracing and the edge protection features of the unitary support structure;

FIG. 5 presents a side view of the photovoltaic roofing apparatus, illustrating the profile of the unitary support structure and the arrangement of the fastening mechanism;

FIG. 6 presents a front view of multiple photovoltaic roofing apparatuses arranged in a stacked configuration, illustrating the modularity and scalability of the unitary support structures when installed on a roofing substrate;

FIG. 7 presents a side view of the photovoltaic roofing apparatus installed on a sloped roofing substrate, illustrating the engagement of the fastening mechanism and the alignment of the unitary support structure with the roof pitch; and FIG. 8 presents an isometric view of the top of the photovoltaic roofing apparatus, illustrating the support framework, fastening points, and the ventilation features of the unitary support structure.

Like reference numerals refer to like parts throughout the several views of the drawings.

DETAILED DESCRIPTION OF THE PREFERRED EMBODIMENT

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
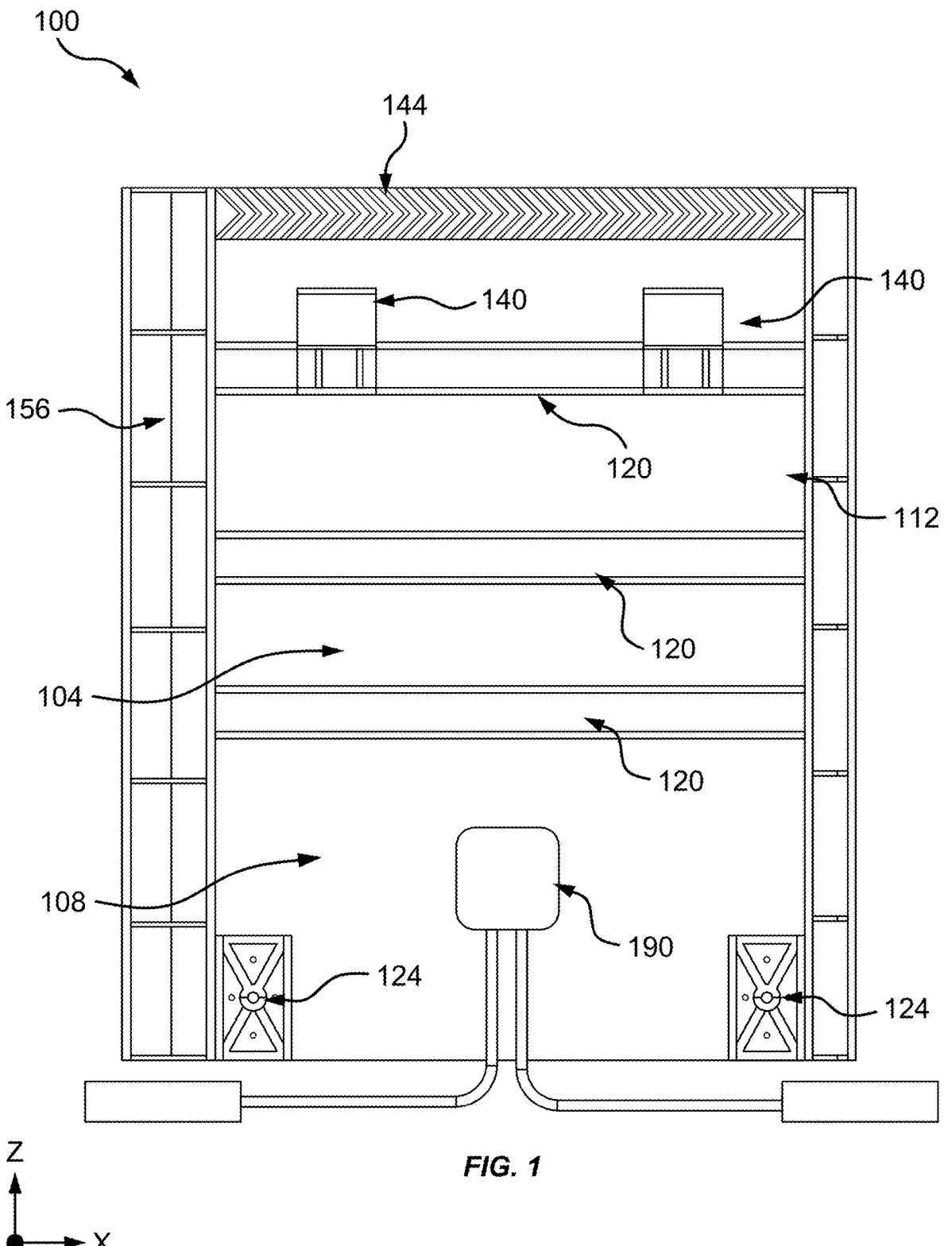
FIG. 1 presents a bottom view of the photovoltaic roofing apparatus, illustrating the layout of the structural components and the interlocking features of the unitary support structure.

As shown throughout the figures, the present invention is directed to a photovoltaic roofing apparatus 100 designed to improve the attachment, installation, and structural integrity of solar roof tiles. The apparatus 100 integrates seamlessly with a glass sandwich 104 of photovoltaic tiles, providing a single, injection-molded structure that includes preferred components such as a rain gutter system for tile locking, edge protection, protrusions for fastening, hooks for securing the tiles, a network of bracing for stability, and a double ventilation baffle for improved airflow and fire resistance. This innovative design simplifies the installation process, enhances durability, and ensures reliable performance in various environmental conditions, as illustrated in FIG. 1.

The photovoltaic tile 104 includes a photovoltaic cell encapsulated within a laminate structure 108. The laminate structure 108, as shown in FIG. 1, consists of layers of glass, ethylene-vinyl acetate (EVA) foil, silicon wafers, EVA foil, and a back sheet. A glass layer 112 is tempered for enhanced durability, and a back sheet 116 is made of a composite material for improved fire resistance. This configuration provides robust protection for the photovoltaic cells while maintaining the overall structural integrity of the tile 104. The tempered glass layer 112 ensures that the tile 104 can withstand various environmental conditions without compromising performance.

A unitary support structure 120 is integrally formed with the photovoltaic tile 104. The support structure 120 may comprise a fastening mechanism 124 configured to secure the photovoltaic tile 104 to a roofing substrate 128. The fastening mechanism 124 may include protrusions 132 that receive connectors, such as screws, for secure attachment. This design, depicted in FIG. 1, ensures that the tiles 104 are firmly held in place, even in adverse weather conditions, thereby enhancing the overall stability of the roofing system. The use of protrusions 132 simplifies the installation process and reduces the need for additional hardware. Additionally, this mechanism may provide a secure and reliable method for fastening the tiles, which is important for maintaining the integrity of the roofing system over time. To that end, a junction box 190 is also included.

Figure 2:
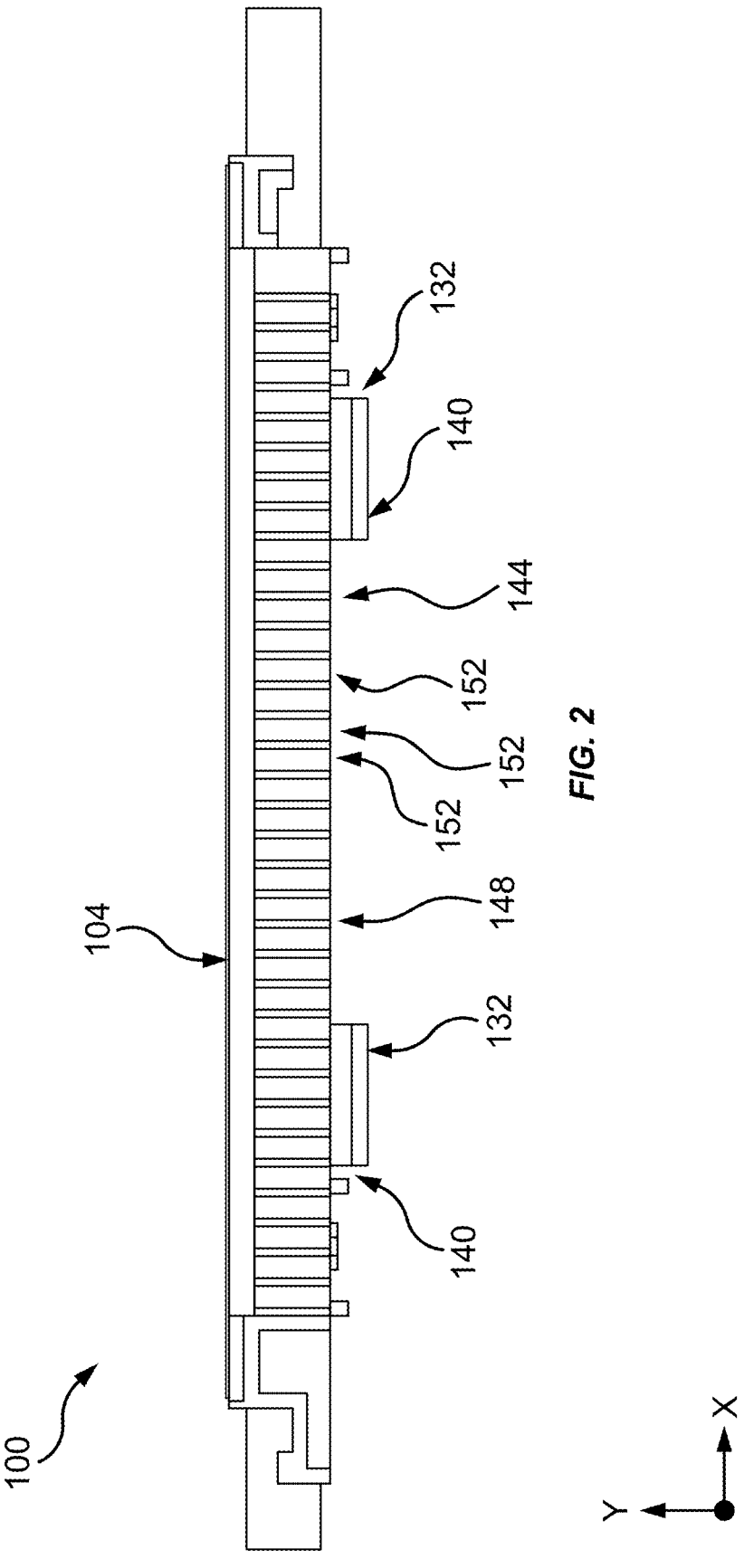
FIG. 2 presents a leading edge view of the photovoltaic roofing apparatus, showing the ventilation system and the profile of the unitary support structure.

An interlocking mechanism 136 is designed to engage with adjacent photovoltaic tiles 104, forming a continuous and stable roofing surface. As depicted in FIG. 2, the interlocking mechanism 136 may comprise hooks 140 that engage with corresponding features on adjacent tiles. These hooks 140 allow for adjustment of the exposure of the photovoltaic tile 104 relative to adjacent tiles, ensuring a uniform and aesthetically pleasing appearance. This feature also provides flexibility during installation, accommodating various roof shapes and sizes. The ability to adjust the exposure of the tiles 104 allows for a more customized installation process, which can be particularly useful in achieving a precise and seamless fit on complex roofing structures.

A ventilation feature 144, illustrated in FIG. 2, is designed to allow airflow beneath the photovoltaic tile 104, enhancing cooling and preventing moisture accumulation. The ventilation feature 144 may comprise a double baffle system 148 with staggered openings 152 to enhance airflow and cooling efficiency while preventing the passage of fire. This configuration not only improves the efficiency of the photovoltaic cells but also enhances the fire resistance of the roofing system, providing a safer and more reliable solution. The staggered openings 152 ensure that airflow is maximized while minimizing the risk of fire spreading through the roofing system. Moreover, the design of the double baffle system 148 is such that it optimizes the balance between ventilation and protection, ensuring that the system remains both efficient and secure.

Edge protection 156 is integrated into the unitary support structure 120 to protect the exposed edges of the photovoltaic tile 104, as shown in FIG. 3. The edge protection 156 includes raised ridges or flanges 160 that prevent damage to the edges of the photovoltaic tile 104, ensuring longevity and durability. This feature is particularly important in preventing wear and tear over time, maintaining the integrity of the roofing system. The raised ridges or flanges 160 provide an additional layer of protection against environmental damage. In addition, this edge protection feature 156 ensures that the edges of the tiles 104 remain intact and secure, which is crucial for the overall longevity and performance of the roofing system.

The unitary support structure 120 is made of a composite material 164 that provides enhanced fire resistance compared to conventional materials. As illustrated in FIG. 4, the composite material 164 includes fire-retardant additives 168 that further improve the fire resistance of the roofing apparatus 100. This material choice not only enhances safety but also contributes to the overall durability and performance of the photovoltaic roofing system. The fire-retardant additives 168 ensure that the material 164 can withstand high temperatures without degrading. This composite material 164, with its advanced fire-resistant properties, significantly enhances the safety and reliability of the roofing system, making it suitable for use in various environments, including those with higher fire risk.

The alignment features 172 of the unitary support structure 120 ensure proper placement and spacing of adjacent photovoltaic tiles 104. FIG. 5 shows that the alignment features 172 include notches or grooves 176 that align with corresponding elements on adjacent tiles, facilitating self-alignment during installation. This design simplifies the installation process, reducing labor costs and installation time, and ensuring a consistent and professional finish. The notches or grooves 176 ensure that the tiles 104 are properly aligned, enhancing the structural integrity of the roofing system. By enabling precise and easy alignment, these features 172 help to maintain the aesthetic and functional quality of the roofing system over the long term.

The ventilation feature 144, positioned at the lower edge of the photovoltaic tile 104, facilitates upward airflow, as depicted in FIG. 6. This positioning allows for effective cooling of the photovoltaic cells, preventing overheating and ensuring optimal performance. Additionally, the ventilation feature 144 acts as a barrier to wind-driven rain and snow, enhancing the environmental durability of the roofing system. The strategic placement of the ventilation feature 144 ensures that airflow is maximized without compromising the integrity of the roofing system. This dual function of providing ventilation while preventing water ingress is important for maintaining the performance and durability of the photovoltaic roofing apparatus 100 in various weather conditions.

The method of installing the photovoltaic roofing apparatus 100 involves several key steps. First, a photovoltaic tile 104, including a photovoltaic cell encapsulated within a laminate structure and a unitary support structure 120, is provided. The unitary support structure 120 comprises a fastening mechanism 124, an interlocking mechanism 136, and a ventilation feature 144. The photovoltaic tile 104 is then secured to a roofing substrate 128 using the fastening mechanism 124 of the unitary support structure 120. The interlocking mechanism 136 of the photovoltaic tile 104 is engaged with corresponding features on adjacent photovoltaic tiles, forming a continuous and stable roofing surface. Airflow beneath the photovoltaic tile 104 is allowed through the ventilation feature 144, enhancing cooling and preventing moisture accumulation. This method, illustrated in FIG. 7, simplifies installation, improves fire resistance, and provides enhanced structural stability to the photovoltaic tile 104. The entire process is designed to be efficient and straightforward, reducing the time and labor required for installation and ensuring a high-quality result.

The photovoltaic roofing apparatus 100 offers significant advantages over prior art by addressing several issues associated with existing solar roof tiles. By reducing the installation process to a single step and eliminating the need for multiple suppliers and components, the invention minimizes labor costs and installation time. The use of composite materials 164 enhances fire resistance, providing better protection against fire hazards. The exoskeleton's design allows for seamless integration with both solar and passive roof tiles, ensuring a uniform appearance and optimal performance. Additionally, the apparatus 100 improves wind resistance and environmental durability, ensuring that the tiles remain securely attached under various weather conditions. Overall, this innovative photovoltaic roofing apparatus 100 offers a more efficient, reliable, and cost-effective solution for integrating solar energy generation into building structures. The comprehensive benefits provided by the apparatus 100 make it an ideal choice for modern roofing applications, where efficiency, safety, and reliability are paramount.

The apparatus 100 also improves fire resistance in two ways. First, the composite materials used to make the apparatus are more fire resistant than materials used in the prior art. Second, at the bottom of the apparatus 100, there is a double baffle 148 instead of a grid. This allows for sufficient airflow needed but deters fire from passing straight through. The baffle 148 is designed to maximize ventilation while preventing direct airflow, enhancing both cooling efficiency and fire resistance. The strategic design of the baffle 148 ensures that it provides maximum protection against fire while maintaining effective ventilation. This dual functionality is crucial for ensuring the safety and efficiency of the photovoltaic roofing apparatus 100.

The hooks 140 in the interlocking mechanism 136 are designed to allow the upper tile 104 to be pulled from the hook up to a ½ inch, enabling the installer to alter the exposure. This feature is particularly useful when a roof plane has an additional space at the top that needs to be adjusted. By dividing this space by the number of rows and stretching each exposure slightly, the installer can eliminate the need for an extra row of tiles, resulting in a more streamlined installation process. The adjustability of the hooks 140 provides flexibility during installation, accommodating various roof configurations. This feature not only simplifies the installation process but also enhances the aesthetic uniformity of the roofing system.

The photovoltaic roofing apparatus 100 can be utilized with composite passive tiles related to solar roof tiles, and any other composite tiles on the market could be improved with the fastening method on the apparatus 100. The photovoltaic roofing apparatus 100 can be made in any size to accommodate different sizes of glass sandwiches 104, making it adaptable to various roofing applications. It can also be made in an "S" tile style, where the pan of the "S" tile will be the area of the apparatus 100, and a glass sandwich 104 of two cells will fit in the pan. The versatility of the apparatus 100 ensures that it can be used in a wide range of roofing applications, providing a flexible solution for different roofing needs. This adaptability makes the apparatus 100 a valuable option for various architectural styles and requirements.

The alignment features 172, such as notches or grooves 176, ensure that the tiles 104 will self-align during installation. This feature reduces the need for precise manual alignment, speeding up the installation process and ensuring a consistent and professional finish. The alignment features 172 also help to maintain the structural integrity of the roofing system by ensuring that each tile is properly positioned and securely attached. The notches or grooves 176 provide a simple yet effective way to ensure that the tiles 104 are aligned correctly during installation. This self-alignment capability is particularly beneficial for large-scale installations, where efficiency and consistency are important.

The composite material 164 of the unitary support structure 120 provides enhanced fire resistance compared to conventional materials. The inclusion of fire-retardant additives 168 in the composite material 164 further improves its fire resistance, making the roofing system safer and more reliable. This material choice not only enhances safety but also contributes to the overall durability and performance of the photovoltaic roofing system. The fire-retardant additives 168 ensure that the composite material 164 can withstand high temperatures without degrading. The advanced fire-resistant properties of the composite material 164 make it an ideal choice for roofing applications in areas prone to wildfires or other fire hazards.

The photovoltaic roofing apparatus 100 is designed to be versatile and adaptable to various roofing applications. The unitary support structure 120 can be used with both solar and passive roof tiles, ensuring a seamless integration that maintains a uniform appearance and optimal performance. The apparatus 100 can be mounted directly to plywood or on an elevated batten/counter batten system, providing greater flexibility in construction methods and ensuring that the roofing system can be used in any installation situation. The adaptability of the apparatus 100 ensures that it can be used in a wide range of roofing applications. This versatility makes the apparatus 100 a valuable addition to any roofing project, offering flexibility and reliability.

The edge protection 156 integrated into the unitary support structure 120 protects the exposed edges of the photovoltaic tile 104, preventing damage and ensuring longevity. The raised ridges or flanges 160 of the edge protection 156 prevent damage to the edges of the photovoltaic tile 104, maintaining the integrity of the roofing system. This feature is particularly important in preventing wear and tear over time, ensuring that the roofing system remains durable and effective. The edge protection 156 provides an additional layer of protection against environmental damage. By safeguarding the edges of the tiles 104, this feature contributes to the overall durability and performance of the roofing system.

The ventilation feature 144 of the photovoltaic roofing apparatus 100 is positioned at the lower edge of the photovoltaic tile 104 to facilitate upward airflow. This positioning allows for effective cooling of the photovoltaic cells, preventing overheating and ensuring optimal performance. Additionally, the ventilation feature 144 acts as a barrier to wind-driven rain and snow, enhancing the environmental durability of the roofing system. The strategic placement of the ventilation feature 144 ensures that airflow is maximized without compromising the integrity of the roofing system. This dual function of providing ventilation while preventing water ingress is important for maintaining the performance and durability of the photovoltaic roofing apparatus 100 in various weather conditions.

The photovoltaic roofing apparatus 100 is designed to be easy to install, with features that simplify the installation process and reduce labor costs. The fastening mechanism 124, interlocking mechanism 136, and alignment features 172 work together to ensure a quick and efficient installation. The use of composite materials 164 and fire-retardant additives 168 enhances the safety and durability of the roofing system, making it a reliable and cost-effective solution for integrating solar energy generation into building structures. The design of the apparatus 100 ensures that it can be installed quickly and easily, reducing installation time and labor costs. This efficiency in installation is a significant advantage for both residential and commercial applications.

The photovoltaic roofing apparatus 100 offers a comprehensive solution to the challenges faced by existing solar roof tiles. By simplifying the installation process, enhancing fire resistance, and improving environmental durability, the apparatus 100 provides a more efficient, reliable, and cost-effective solution for integrating solar energy generation into building structures. This innovative design addresses the issues associated with existing solar roof tiles, offering significant advantages over prior art and setting a new standard in the photovoltaic roofing industry. The comprehensive design of the apparatus 100 ensures that it meets the needs of modern roofing applications, providing a reliable and efficient solution for integrating solar energy generation into building structures.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A photovoltaic roofing apparatus comprising:
a photovoltaic tile including a photovoltaic cell encapsulated within a laminate structure;
a unitary support structure integrally formed with the photovoltaic tile, the unitary support structure comprising:
a plurality of crossmembers extending laterally between opposing frame members to distribute load and define internal support compartments;
a fastening mechanism comprising at least one protrusion extending from an upper edge of the unitary support structure and configured to secure the photovoltaic tile to a roofing substrate;
an interlocking mechanism disposed along a lower edge of the unitary support structure and configured to engage with an adjacent photovoltaic tile to form a continuous and stable roofing surface; and
a ventilation feature comprising a double baffle system positioned along the underside of the unitary support structure and defining a plurality of staggered openings configured to permit airflow beneath the photovoltaic tile while impeding the passage of flame and moisture; wherein
the unitary support structure is formed as a single molded frame that provides integrated alignment and structural reinforcement for the photovoltaic tile.

2. The photovoltaic roofing apparatus of claim 1, wherein the photovoltaic tile is secured to the roofing substrate by one or more connectors received by the protrusion, the connectors comprising screws.

3. The photovoltaic roofing apparatus of claim 1, wherein the interlocking mechanism comprises hooks configured to engage with corresponding features on adjacent photovoltaic tiles.

4. The photovoltaic roofing apparatus of claim 3, wherein the hooks allow for adjustment of the exposure of the photovoltaic tile relative to adjacent tiles.

5. The photovoltaic roofing apparatus of claim 1, wherein the laminate structure of the photovoltaic tile includes layers of glass, ethylene-vinyl acetate (EVA) foil, silicon wafers, EVA foil, and a back sheet.

6. The photovoltaic roofing apparatus of claim 5, wherein the glass layer is tempered safety glass configured to increase impact resistance and mechanical durability.

7. The photovoltaic roofing apparatus of claim 5, wherein the apparatus is formed of a composite resin or polymeric material incorporating fire-retardant fillers or additives selected to resist ignition and limit flame spread when exposed to heat.

8. The photovoltaic roofing apparatus of claim 1, further comprising edge protection integrated into the unitary support structure to protect exposed edges of the photovoltaic tile.

9. The photovoltaic roofing apparatus of claim 8, wherein the edge protection includes raised ridges or flanges to prevent damage to the edges of the photovoltaic tile.

10. The photovoltaic roofing apparatus of claim 1, wherein the unitary support structure is made of a fiber-reinforced composite material containing thermoset or thermoplastic resin and fire-retardant additives configured to provide flame-spread resistance greater than that of an unfilled resin base.

11. The photovoltaic roofing apparatus of claim 1, wherein the ventilation feature is positioned at the lower edge of the photovoltaic tile to facilitate upward airflow.

12. The photovoltaic roofing apparatus of claim 11, wherein the ventilation feature also acts as a barrier to wind-driven rain and snow.

13. The photovoltaic roofing apparatus of claim 1, wherein the unitary support structure further comprises alignment features that ensure proper placement and spacing of adjacent photovoltaic tiles.

14. The photovoltaic roofing apparatus of claim 13, wherein the alignment features include notches or grooves that align with corresponding elements on adjacent tiles for self-alignment during installation.

* * * * *